Oct. 1, 1963 E. C. GREANIAS ET AL 3,105,956

CHARACTER RECOGNITION SYSTEM

Filed Dec. 30, 1957 9 Sheets-Sheet 1

*INVENTORS*
EVON C. GREANIAS
ARTHUR HAMBURGEN

*BY* Paul M. Brannen

*AGENT*

Oct. 1, 1963 E. C. GREANIAS ET AL 3,105,956

CHARACTER RECOGNITION SYSTEM

Filed Dec. 30, 1957 9 Sheets-Sheet 2

Oct. 1, 1963 E. C. GREANIAS ETAL 3,105,956

CHARACTER RECOGNITION SYSTEM

Filed Dec. 30, 1957 9 Sheets-Sheet 3

CHARACTER RECOGNITION SYSTEM

Filed Dec. 30, 1957 9 Sheets-Sheet 4

| | | | | |
|---|---|---|---|---|
| 1B | A2 | B1 | E2 | E3 |
| 2B | A7 | B6 | C5 | D4 |
| 3B | A7 | B7 | D7 | E7 |
| W | A5 | A6 | E5 | E6 |

| | | | | |
|---|---|---|---|---|
| 1B | B1 | D3 | E1 | E2 |
| 2B | C4 | D3 | D4 | E2 |
| 3B | A6 | B7 | E5 | E6 |
| W | A2 | A3 | A5 | B4 |

| | | | | |
|---|---|---|---|---|
| 1B | A4 | B3 | C2 | D1 |
| 2B | A5 | B5 | C5 | D5 |
| 3B | D3 | D5 | D6 | D7 |
| W | A3 | B2 | B1 | C1 |

| | | | | |
|---|---|---|---|---|
| 1B | A1 | A2 | A3 | E1 |
| 2B | B3 | C3 | D3 | E4 |
| 3B | A6 | B7 | D7 | E6 |
| W | A4 | B4 | E2 | E3 |

| | | | | |
|---|---|---|---|---|
| 1B | A3 | A4 | A5 | B2 |
| 2B | A4 | A5 | C4 | D4 |
| 3B | A6 | B7 | D7 | E6 |
| W | A2 | B1 | E2 | E3 |

| | | | | |
|---|---|---|---|---|
| 1B | A1 | B1 | E1 | E2 |
| 2B | C5 | C6 | C7 | D4 |
| 1W | B7 | C4 | E5 | E6 |
| 2W | A7 | B7 | D7 | E7 |

| | | | | |
|---|---|---|---|---|
| 1B | A2 | A3 | E2 | E3 |
| 2B | A5 | A6 | D7 | E6 |
| 3B | A5 | B4 | C4 | D4 |
| W | A4 | B2 | D6 | E4 |

| | | | | |
|---|---|---|---|---|
| 1B | B4 | C4 | E2 | E3 |
| 2B | A2 | A3 | B1 | B4 |
| 3B | B7 | D6 | E4 | E5 |
| W | A5 | A6 | D7 | E6 |

| | | | | |
|---|---|---|---|---|
| 1B | A2 | B1 | E2 | E3 |
| 2B | A5 | A6 | D7 | E6 |
| 3B | A4 | A5 | E3 | E4 |
| W | B4 | C4 | C5 | D4 |

| | | | | |
|---|---|---|---|---|
| 1B | B2 | C1 | C2 | C3 |
| 2B | C4 | C5 | C6 | C7 |
| 1W | A1 | A7 | B1 | B7 |
| 2W | D1 | D7 | E1 | E7 |
| 3W | A3 | A4 | A5 | B5 |

Oct. 1, 1963 E. C. GREANIAS ET AL 3,105,956

CHARACTER RECOGNITION SYSTEM

Filed Dec. 30, 1957 9 Sheets-Sheet 5

Oct. 1, 1963 E. C. GREANIAS ET AL 3,105,956

CHARACTER RECOGNITION SYSTEM

Filed Dec. 30, 1957 9 Sheets-Sheet 6

3,105,956
Patented Oct. 1, 1963

3,105,956
CHARACTER RECOGNITION SYSTEM

Evon C. Greanias, Vestal, and Arthur Hamburgen, Endicott, N.Y., assignors to International Business Machines Corporation, New York, N.Y., a corporation of New York Filed Dec. 30, 1957, Ser. No. 706,087
11 Claims. (Cl. 340—146.3)

This invention relates to character recognition systems, and particularly to an improved character recognition system employing matching techniques which utilize electronic components and circuits to achieve high speed character recognition with a relatively small amount of apparatus, and without recourse to slow or unwieldy arrangements for compensating for misalignment of characters with respect to the scanning devices.

The primary object of this invention is to provide an improved character recognition system.

One of the most basic sources of information in the business or scientific fields is a printed document. The information in these documents is normally transcribed manually into some media, such as punched cards or tape so as to be suitable for machine use. In the present invention the information on the document in the form of characters is scanned by suitable apparatus to produce signal patterns which are then analyzed to identify the character scanned.

Various systems have previously been proposed for sensing characters such as printed or otherwise formed letters on material. Such characters may be alphabetic letters, numerals or various special symbols. Some of the earlier arrangements for sensing characters involved the use of a beam of light which progressively traverses the character and causes the characteristics of the area traversed to control the operation of a light sensitive device of variation in reflected or transmitted light. The logic arrangements used in these systems to identify the character was generally dependent upon the times during which certain unique portions of the character were sensed by the scanning beam. Such systems are relatively slow and are limited to the sensing of characters which are properly positioned in relation to the scanning beam and in many instances such characters had to be specially formed. Other attempts were made along similar lines utilizing characters which were specially formed to include a code mark in the vicinity of the character with character recognition being accomplished by sensing the code mark or marks rather than the character itself. Although this provides a relatively simple means of identifying characters, such arrangements have seen little use in view of the fact that special printing equipment was required to print characters of this type and in many instances the printing is not suitable from an appearance standpoint because of the code marks.

Still another approach to character recognition involves a mechanical mask matching technique. In such arrangements, the image of the character is compared with suitable masks usually provided on an opaque disc and arranged so that a photocell detects the matching of the character image and the mask on the disc to then provide an output signal indicative of the identity of the character.

Still other character recognition systems are arranged to scan a character to be recognized and to then derive a suitable coded information from the scanning information, which coded information is then analyzed by suitable circuits to determine whether or not a particular character has been scanned. These arrangements are useful in situations where misalignment of printing occurs, since they thereby make it possible to reduce the amount of information which must be analyzed in order to completely scan the entire area in which the character may appear.

The present invention differs from the arrangements previously proposed in that the characters are scanned by suitable scanning means as they are fed past a scanning station by a document transport system, and the scanning information is provided in its original character form, in which it represents actual information derived from the scanning of a character, rather than an encoded or reduced form. This information is then supplied to a suitable matrix in which the information is shifted through the matrix in synchronism with the motion of the character past the scanning device, with suitable logic circuit means connected to the storage matrix so that when the character information occupies a predetermined arrangement of storage positions, an output circuit will be energized to provide an indication of the character scanned.

Since the storage matrix can be operated at electronic speeds to shift the character information through various possible configurations, it is possible to use this dynamic comparison arrangement at relatively high speeds compared with previously known systems.

The characters to be recognized may appear in different forms, such as for example, graphic characters printed on paper or record cards. In the case of printed characters, these characters may be scanned by suitable light beam scanning devices in which there is provided a photomultiplier which is responsive to varying degrees of light reflected from the document during the scanning operation. Also, image dissecting apparatus could be used wherein successive portions of the character would be presented to the photomultiplier or light sensitive device, the character itself being fully illuminated. Either serial or parallel scanning may be employed, parallel scanning in the case of printed characters being provided by utilizing a plurality of photo-responsive devices arranged in a line transverse to the motion of a document to be scanned, with suitable slits or apertures so that the light which reaches each photo-conductive device reflects the scanning of a small portion of the character, with a plurality of adjacent portions being scanned simultaneously.

The invention is not limited to use with optical scanning devices for scanning printed characters by transmitted or reflected light, but is also applicable to the scanning of magnetic characters, that is, characters formed in such manner as to include a magnetizable or magnetized substance in the character configuration, and wherein parallel scanning pickup or sensing heads are arranged so that as the magnetized or magnetizable character passes thereunder, the change in the magnetic field conditions caused by the active portions of the character will provide signals which will then be analyzed by the subsequent portion of the system.

Another object of the present invention is to provide a character recognition system capable of recognizing a complete set of alphanumeric characters in a large number of different type fonts.

Another object of the invention is to provide an improved character recognition system for recognizing either conventionally printed or magnetic characters and providing output signals indicative of the characters recognized in accordance with patterns of information derived from scanning the characters.

Another object of the invention is to provide a character recognition system in which the characters are serially scanned in a plurality of scans to provide signals during the intervals that a portion of a character is sensed, and thereafter advancing such scanning information through a suitable storage matrix in which various combinations of scanning information will produce output signals indicative of the character scanned.

Still a further object of the invention is to provide a character recognition system in which the characters to be recognized are scanned and the information derived therefrom is supplied to a storage matrix by means synchronized with the scanning, whereafter the information is advanced through the storage matrix in synchronism with the scanning means and various combinations of information are determined at predetermined points in the matrix by suitable logic circuits to provide an output indicative of the character scanned.

Yet another object of the invention is to provide a character recognition system in which the character to be recognized is scanned and the information derived therefrom is supplied to a two-dimensional storage matrix by means synchronized with the scanning, and wherein the information in the two-dimensional storage matrix is advanced in the first and second dimensions by suitable synchronizing means so that registration of the character information with particular logic circuits which are arranged to provide an output indicative of the character scanned is assured during the shifting of the information through the storage matrix.

Other objects of the invention will be pointed out in the following description and claims and illustrated in the accompanying drawings, which disclose, by way of examples, the principle of the invention and the best mode, which has been contemplated, of applying that principle.

Figure 3:
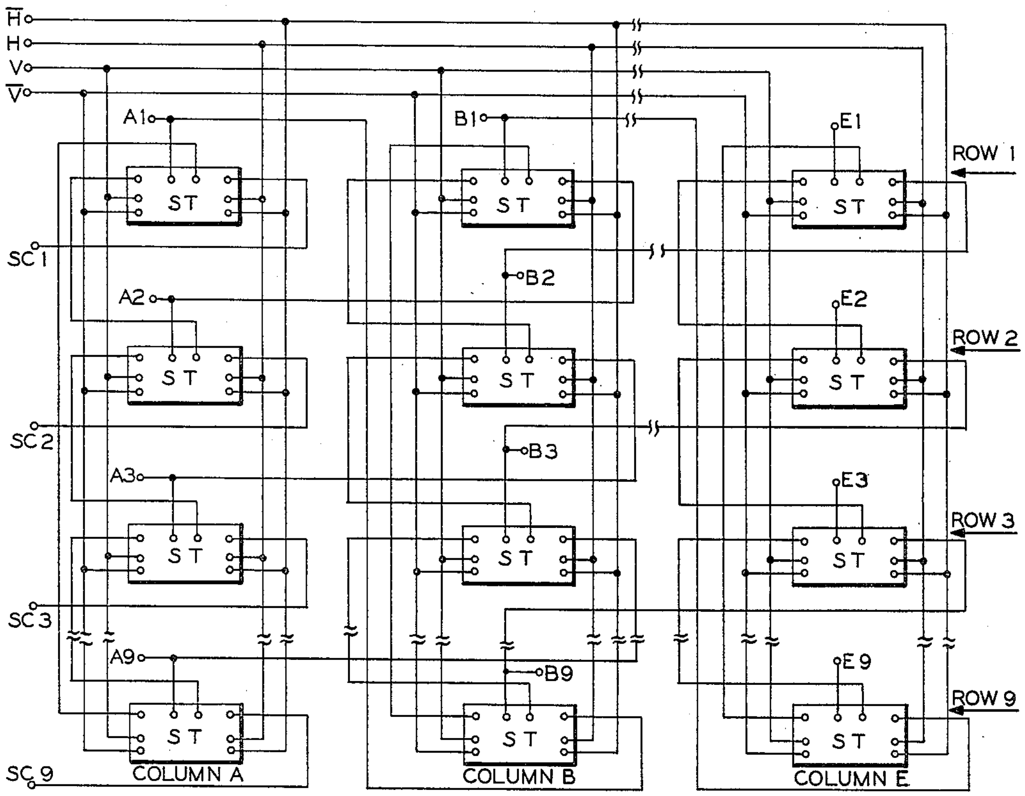
FIG. 3 is a diagrammatic illustration of one form of shifting register matrix which may be utilized in the present invention.

FIGS. *4a* and *4b*, show the detailed circuit arrangement and the symbolic representation, respectively, of one form of shifting register storage element which may be utilized in the shifting register matrix of FIG. 3.

FIGS. *5a* through *5j* show in symbolic representation the character outlines of a set of characters which may be recognized by the system illustrated in the drawings of FIG. 1 through FIG. 4, and indicate in tabular form the necessary arrangement of the inputs to the diode logic circuits from the shifting register matrix in order to determine whether the associated character has been recognized.

Figure 6:
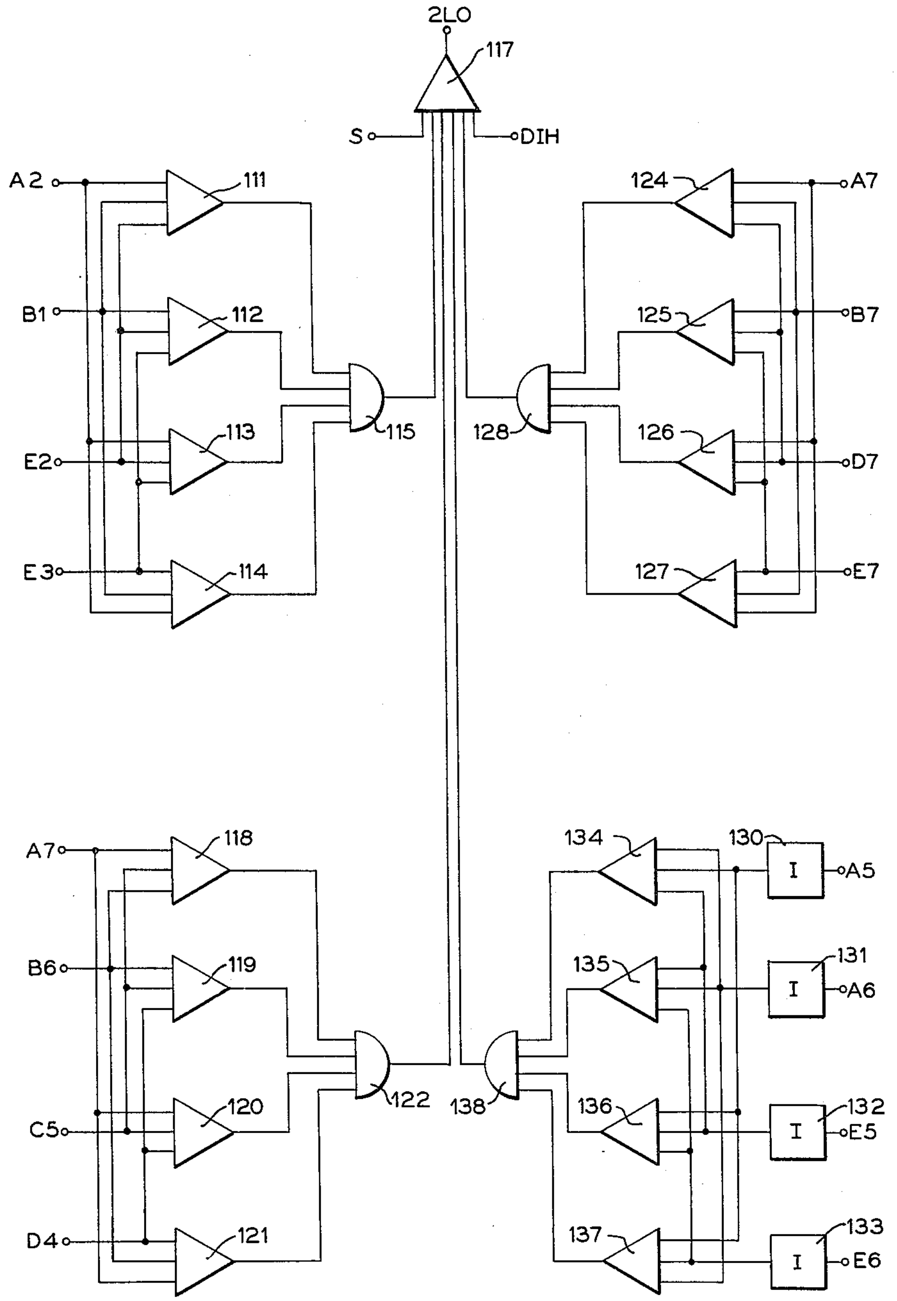

FIG. 6 is a diagrammatic illustration of one of the diode logic circuits utilized for the character recognition system shown in the previous drawings, and illustrates the circuitry employing in decoding the scanning information representing the character "2."

Figure 7:
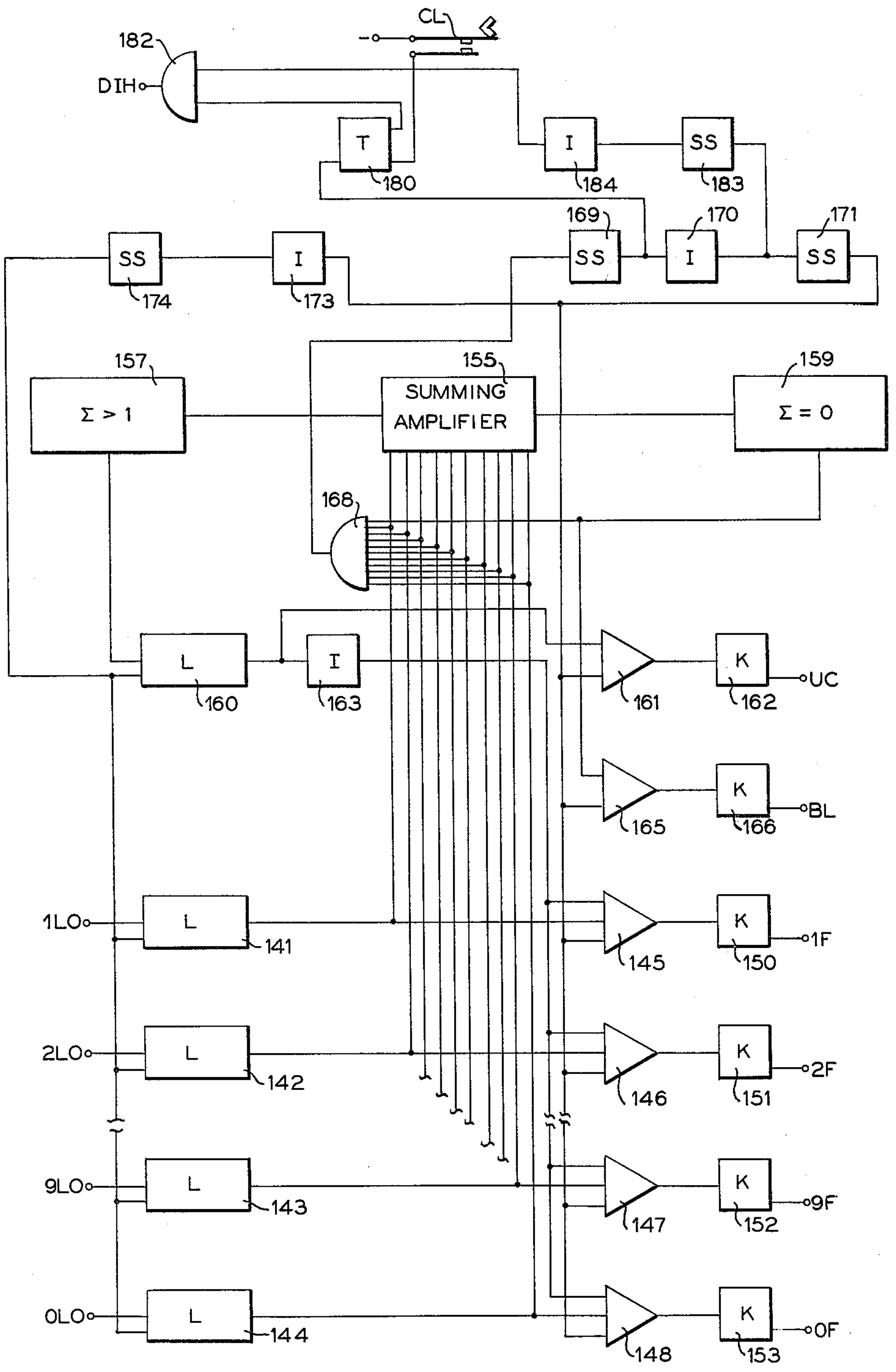

FIG. 7 is a diagrammatic illustration of one form of output circuits, including checking circuits and timing and reset circuitry.

Figure 8:
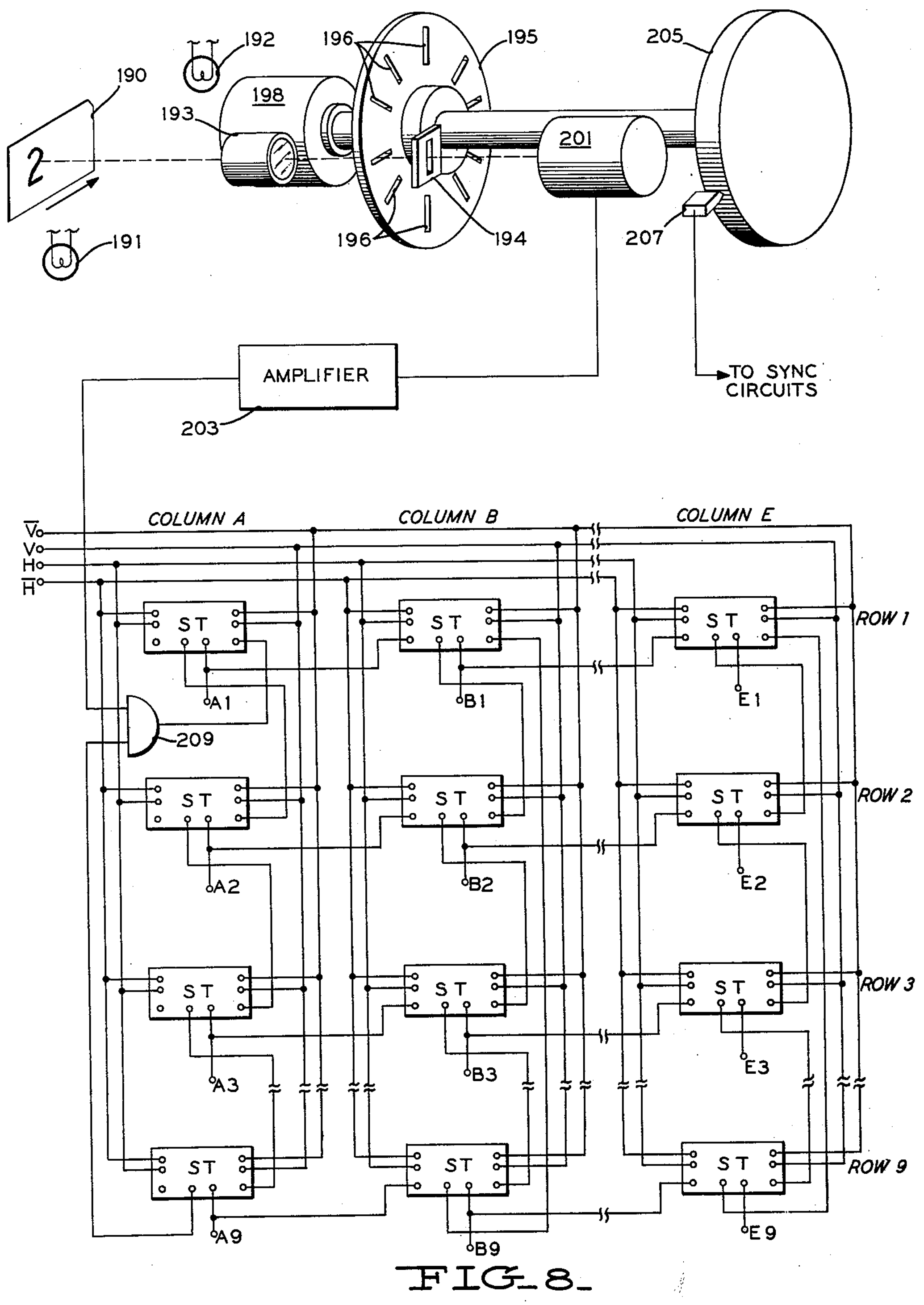

FIG. 8 is a diagrammatic illustration of one modification of the system, employing serial optical scanning and a modified form of the two-dimensional shifting register.

Figure 9:
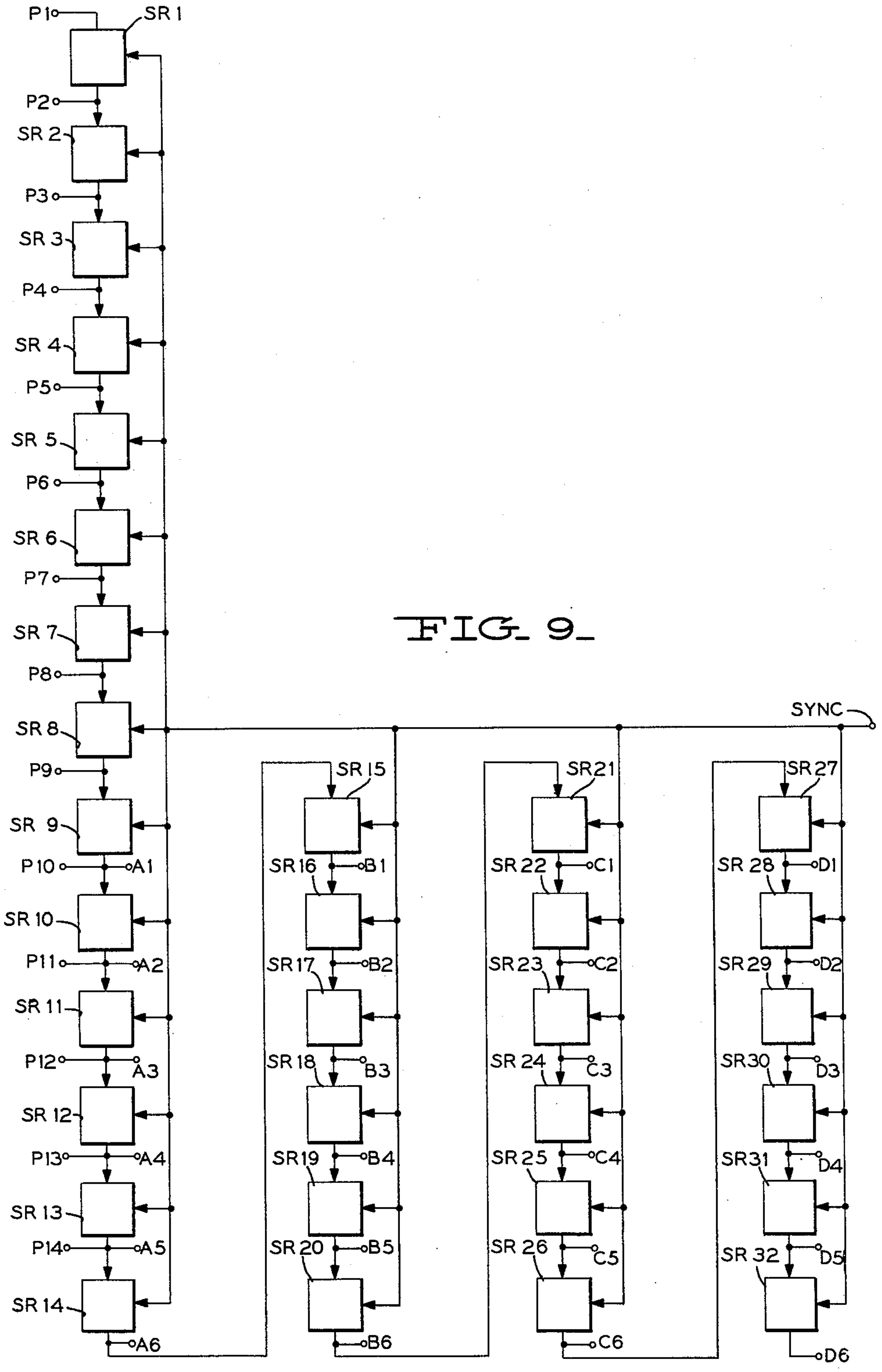

FIG. 9 is a diagrammatic illustration of another modification of the invention, utilizing a unidimensional shifting register.

Figure 10:
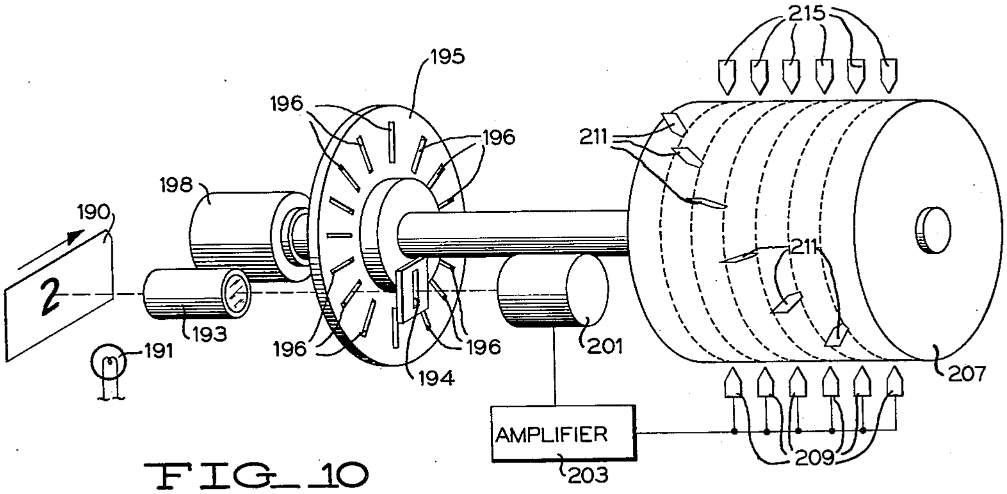
Figure 11:
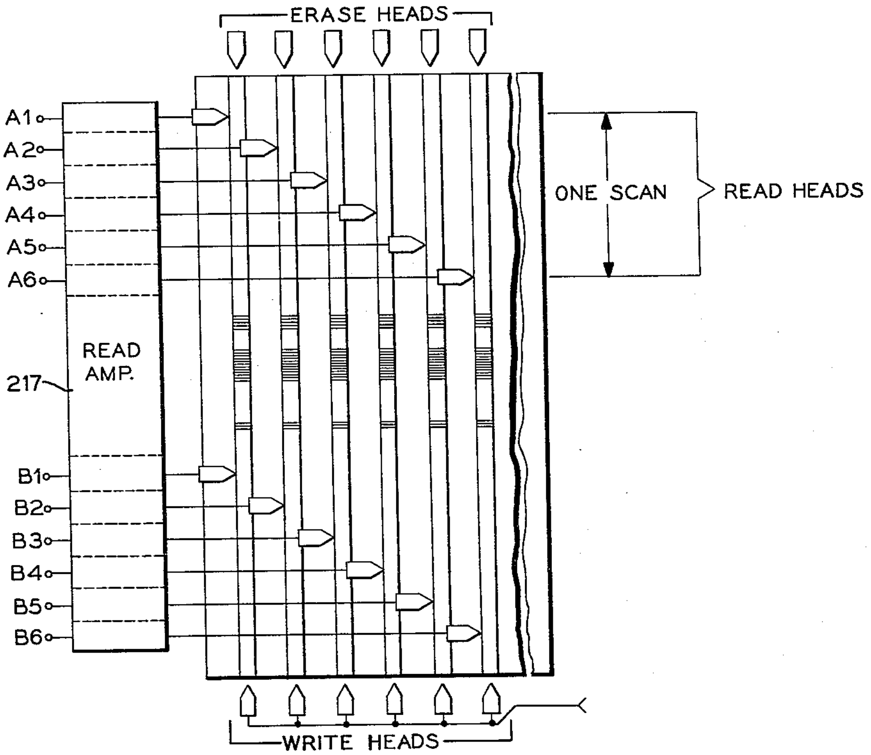

FIGS. 10 and 11 are diagrammatic illustrations of still another modification of the invention, utilizing a magnetic drum as a storage matrix.

Similar reference characters refer to similar parts in each of the several views.

Figure 1:
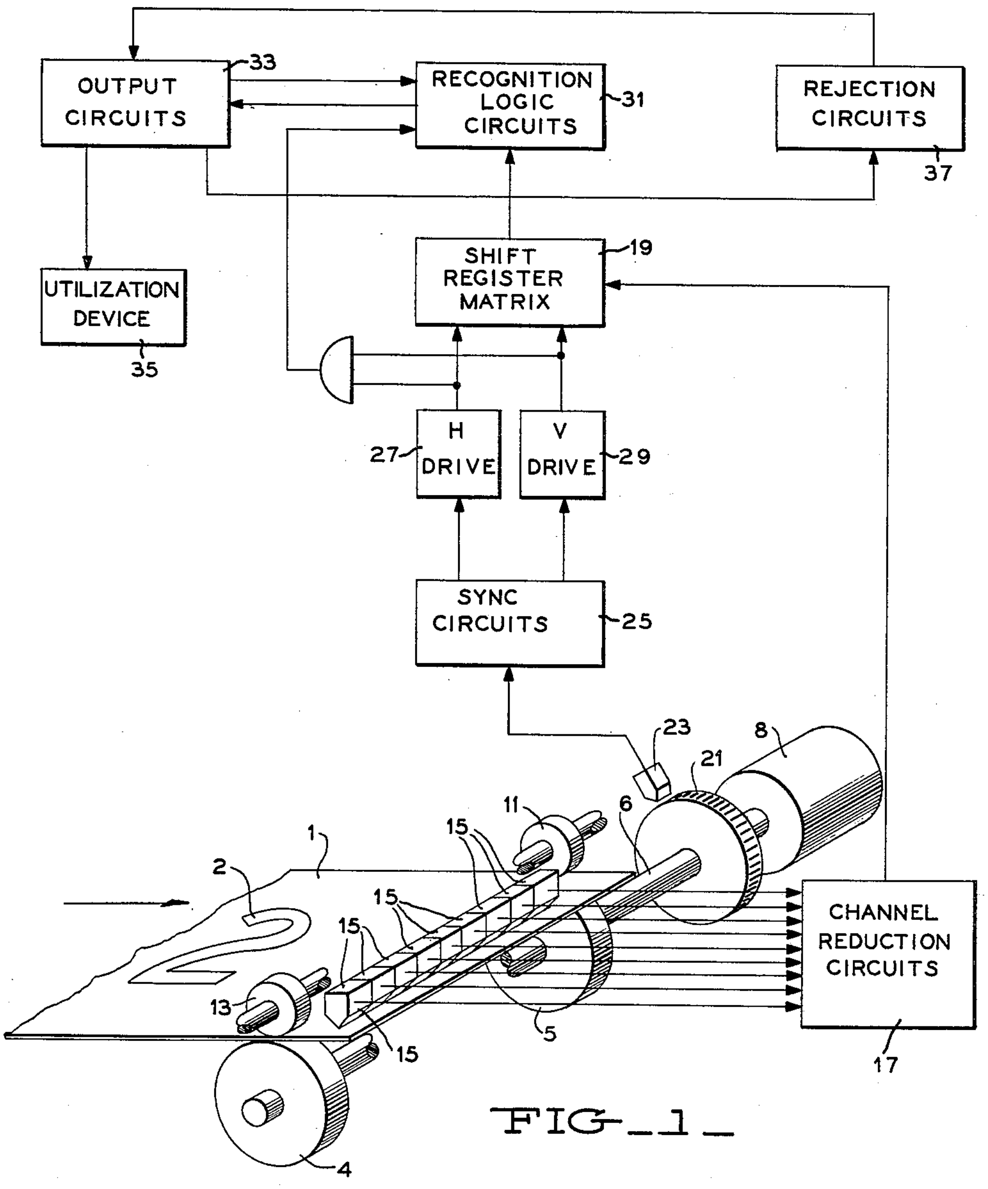
FIG. 1 shows an over-all block diagram of one embodiment of the present invention.

Referring now to FIG. 1 of the drawings, there is shown a general schematic illustration of one embodiment of the present invention, in which parallel scanning of a character is provided and in which a two-dimensional shift register matrix is employed. The reference character 1 designates a document of some form, bearing characters such as the characters "2" shown and designated by the reference character 2, which is to be recognized. The documents are transported for scanning by any suitable transport mechanism, of which only a portion is shown, including a pair of feed rolls 4 and 5, mounted on a common shaft 6 which is rotated at constant speed by a directly connected motor 8. A pair of pressure rollers 11 and 13 are mounted on suitably biased shafts so as to grip the document 1 between the pressure rollers and the feed rolls, thereby advancing the document in the direction shown by the arrow as the shaft 6 rotates.

An array of sensing elements is shown, aligned transversely to the direction of motion of the document and the characters thereon. Each scanning element is arranged in such a manner that it examines a predetermined slice or path of the document as the document is fed past, and provides an output signal when a portion of the character to be recognized is passing thereunder. The sensing elements may constitute a plurality of photosensitive devices, with suitable masks or apertures to detect changes in reflected or transmitted light as caused by the presence of a portion of a character, or they may be magnetic pickup heads arranged to provide an output signal when any portion of a magnetized or magnetizable character passes thereunder. Each of the sensing elements 15 is connected by an individual channel through suitable channel reduction circuits indicated generally by the labeled rectangle 17.

It should be noted that the number of sensing elements in the parallel sensing array are sufficient to provide a plurality of adjacent and concurrent scans through a charatcer no matter where the character is located within the maximum misalignment tolerance. One feature of the invention provides for recognizing the character despite such misalignment, as will be subsequently explained in detail. From the channel reduction circuit 17, the scanning information is provided on a reduced number of secondary channels to the input of a shift register matrix 19, which may take any one of a number of forms as will be subsequently described. The entry of the scanning information into the shift register 19 and the subsequent handling of the information is governed by suitable synchronizing circuits which are primarily governed by the scanning means, in this case the document transport arrangement including the feed rolls 4 and 5 which carry the document past the sensing elements. In FIG. 1, there is shown a magnetic drum 21 mounted on shaft 6 for rotation therewith, this drum having a plurality of indexing or timing spots permanently recorded thereon by some suitable means and at suitable intervals as will be later defined. The passage of these timing marks past a pickup head 23 generates timing signals or pulses therein which are thereafter suitably amplified and utilized for generation of synchronizing pulses by the circuits designated by the labeled rectangle 25. In the embodiment to be described, the shift register matrix is two-dimensional so that synchronizing circuits for both horizontal and vertical shifting are provided and are derived from the synchronizing circuits 25 by the circuits designated generally by the rectangle designated H drive 27 and V drive 29. The outputs from the horizontal and vertical drive circuits 27 and 29 are supplied to the shift register matrix 19 along with the scanning information as indicated by the information flow arrows in the drawing.

Connected to predetermined storage locations in the shift register matrix in appropriate combinations are a plurality of recognition logic circuits indicated generally by the labeled rectangle 31. Briefly described, these circuits comprise means for recognizing the existence of certain combinations of information stored in the storage elements of the shift register matrix, and when these combinations are present, a specific output is provided from a selected one of the recognition logic circuits, signifying that the character represented thereby has been scanned. The output from the recognition logic circuits is supplied to suitable output circuits including temporary storage means, designated by the labeled rectangle 33, from whence the output signals indicative of the character scanned may be supplied to a suitable utilization device, such as a card punch or printer, designated by the reference character 35.

There is also shown in FIG. 1 a labeled rectangle 37 designated as rejection circuits, the input of which is connected to the output circuits 33 and the output of which is connected to the same circuit. The rejection circuits operate to check the proper operation of the apparatus and to prevent erroneous outputs to the utilization device 35.

It will also be noted that the outputs of the horizontal and vertical drive circuits 27 and 29 are shown as being combined and supplied to the recognition logic circuits 31, since the determination of scanning time and hence the proper time for output is determined by the circuits 27 and 29.

Figure 2:
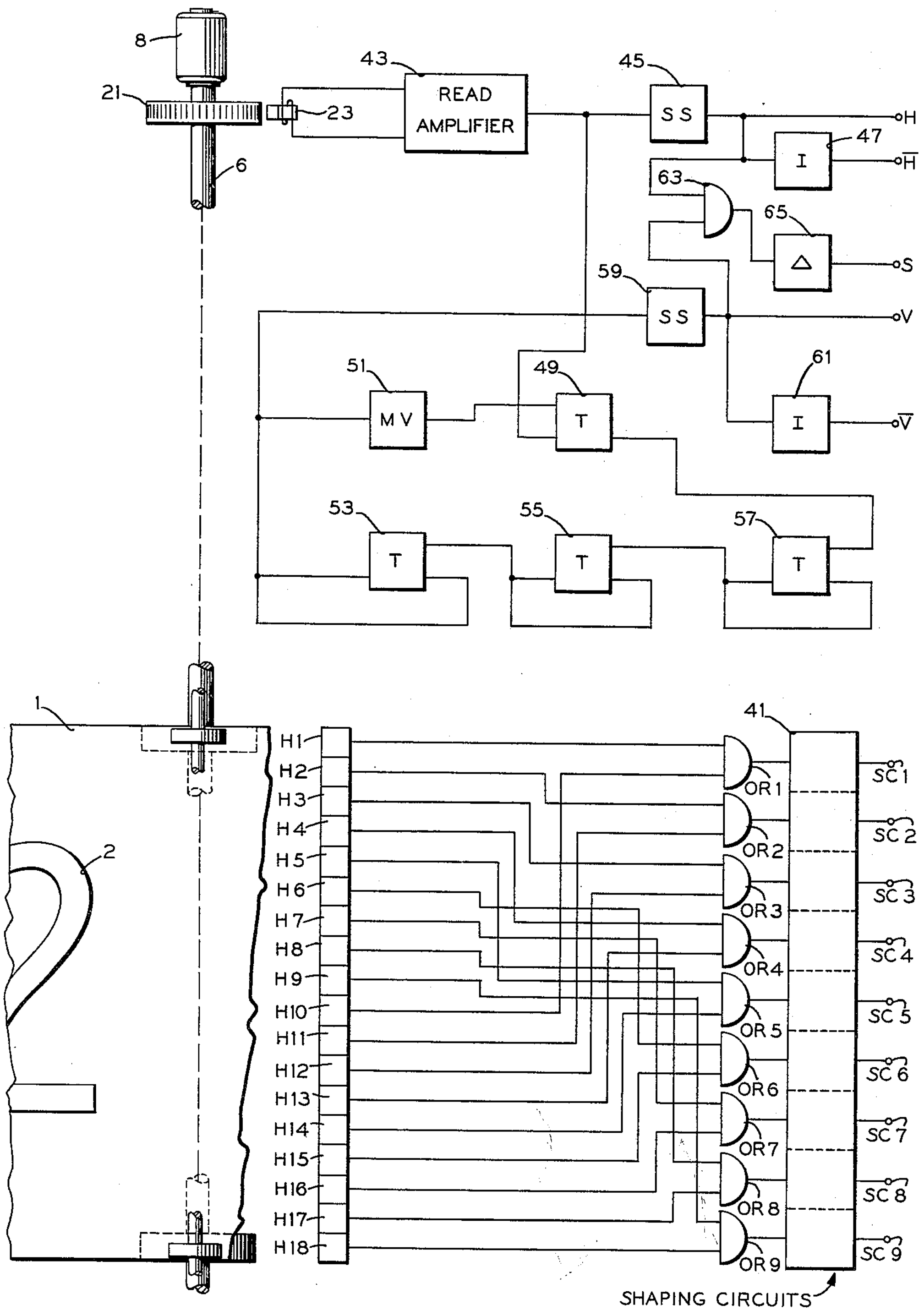
FIG. 2 is a diagrammatic illustration of the scanning elements, the channel reduction system and the synchronizing circuits, utilized in the arrangement shown generally in FIG. 1.

Referring now to FIG. 2 of the drawings, there is shown in more detail the array of sensing elements, the channel reduction circuits which provide outputs to a plurality of secondary channels for supply to the storage matrix, and the synchronizing circuits associated with the magnetic drum for providing the synchronizing signals for operation of the two-dimensional shift register and certain of the output circuits. The sensing array comprises a plurality of sensing elements, in this case considered to be magnetic heads or pickups, numbered consecutively with the reference characters H1 through H18. These pickup heads or elements are arranged in a line transverse to the direction of motion of the characters to be scanned and span a distance equal to the maximum height of characters to be recognized plus the maximum misalignment tolerance. In the embodiment shown, the character is assumed to have a possible misalignment anywhere between the edges of the document, so that the sensing array spans the entire width of the document as shown. These scanning elements or magnetic pickup heads are connected in a repeated sequence to a plurality of mixing circuits, one for each of the secondary channels which is to be connected to the input of the shift matrix, the mixing circuits being designated by the reference characters OR1 through OR9. The details of these mixing circuits are not shown or described since they form no portion of the invention, and instead are indicated symbolically by the usual symbol of a semicircle, commonly employed in the art of electrical computers to indicate a logical "OR" circuit, that is, one which supplies an output from the convex side of the symbol when any one or all of the input lines on the straight edge of the symbol are energized. It can be seen from the drawing that the heads H1 through H9 are connected in order to one of the two inputs of the mixers OR1 through OR9. The scanning elements H10 through H18 are similarly connected in consecutive order to the mixing circuits OR1 through OR9. Thus, the reduced number of secondary channels which constitute the outputs from the mixing circuits OR1 through OR9 accept information from the primary channels connected to the heads H1 through H18 at intervals spaced apart by the number of secondary channels. This number is also equal to the maximum height of a character, in terms of number of sensing elements required to span the character. The outputs from the mixing or "OR" circuits OR1 through OR9 are supplied through suitable shaping circuits indicated generally by the labeled rectangle 41, which includes, for each of the secondary channels, suitable amplifying, integrating and limiting circuits. The exact nature of these circuits need not be described since it is not essential to the present invention and any one of a number of well known forms could be employed. The outputs of the shaping circuits are supplied to a series of terminals designated by the reference characters SC1 through SC9, and these represent the secondary channels which supply the scanning information to the inputs of the shifting register matrix to be subsequently described.

FIG. 2 also shows a more detailed schematic diagram of the synchronizing circuits governed by the magnetic drum 21 on the document transfer shaft 6. As shown in FIG. 2, the sync track head 23 is arranged to have pulses generated therein by the passage of magnetized spots on the drum 21, with the induced pulses being amplified in a suitable read amplifier 43. Each pulse supplied through read amplifier 43 is supplied to the input of a conventional single-shot or monostable multivibrator 45, the output of which is supplied to a terminal designated by the reference character H and which is used for horizontal synchronization or driving in the operation of the shifting matrix. The output of the single-shot 45 is also supplied through a conventional inverter circuit 47 to the terminal $\overline{H}$ to serve as the negative portion of the bipolar shifting pulses for the shifting register matrix. The timing or sync pulses read from the drum 21 are additionally supplied from the output of the read amplifier 43 to one input of a conventional trigger 49. The output of this trigger governs the operation of a free-running multivibrator 51 in such manner that when trigger 49 is turned on by a sync pulse supplied from read amplifier 43, the multivibrator 51 will be activated to provide a plurality of pulses from its output for such time as the trigger 49 is turned on.

Connected to the output of multivibrator 51 is a cascade of three conventional triggers 53, 55 and 57, each having their inputs connected together and the outputs of triggers 53 and 55 being connected to the inputs of the following triggers 55 and 57, respectively. Since the triggers are connected in this manner, they form a binary counting chain and it will be apparent that for every eight input pulses supplied to trigger 53 an output pulse will be supplied from trigger 57. The output pulse from trigger 57 is supplied to the trigger 49 to turn this trigger off which in turn cuts off the multivibrator 51 and hence stops the operation of the counting chain. It can be seen therefore, that for every sync pulse supplied from read amplifier 43, the multivibrator 51 will supply eight output pulses and then halt until the next sync pulse is received from read amplifier 43 to turn trigger 49 on again. The output pulses from multivibrator 51 are supplied to a single shot 59 for shaping purposes and timing and thence to a terminal V, and through a conventional inverter 61 to a terminal $\overline{V}$. These terminals are connected to the bipolar synchronizing lines for vertical shifting in the shift matrix to be described.

For the operation of the logic circuits to be described later, there is provided a sampling pulse which is obtained by combining the outputs from the terminals H and V in an OR circuit 63, which is then fed through a suitable type of delay unit 65 to a terminal S, this designation being adopted since the pulse is considered to be a sample pulse.

From the foregoing it can be seen that the shifting register will be provided with suitably timed and related horizontal and vertical synchronizing or shifting pulses as a result of the operation of the sync track on the drum 21 which, of course, is mechanically synchronized with the motion of the character-bearing document having characters to be recognized thereon. Thus, the motion of the characters to be recognized with respect to the sensing or scanning elements is synchronized with the remainder of the system.

Referring now to FIG. 3 of the drawings, there is shown a partial view of a shift register matrix which may be employed in the present invention. The shift matrix comprises a plurality of storage elements arranged in parallel columns and rows. The columns are indicated alphabetically with the first two columns A and B and the last column E shown, the intervening columns being omitted for the sake of clarity. Similarly, the first three rows, namely, row 1, row 2 and row 3, and the last row, row 9, are shown, the intervening rows between row 3 and row 9 being omitted for the sake of simplifying the drawings. At the intersection of each of the rows and columns, there is provided a bistable storage unit of a type suitable for storing binary values of information and shifting this information to another storage unit in accordance with the supply to the storage elements of suitable synchronizing impulses. Although a number of arrangements may be employed for the storage elements, one particular arrangements especially useful in the present invention as shown in FIGS. 4*a* and 4*b*, FIG. 4*a* showing a schematic illustration of the circuits found within the element, and FIG. 4*b* showing the symbolic illustration of the element to correlate the connections thereto with the showing in FIG. 3.

Figure 4A:
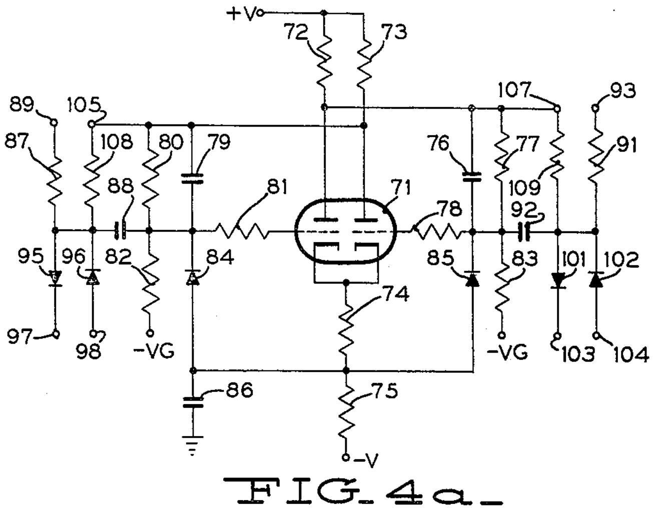
Figure 4B:
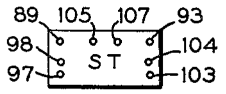

In FIG. 4*a*, the reference character 71 designates a twin triode, the anodes of which are connected through resistors 72 and 73 to a suitable source of positive direct current potential and the cathodes of which are connected together and through a pair of common cathode resistors 74 and 75 to a source of negative potential —V. The anode of each triode section is connected to the opposite grid through a cross-coupling network such as the capacitor 76 and resistor 77 connected between the left-hand anode and grid of the right-hand triode section, a suitable current limiting resistor 78 being interposed therebetween. Likewise, the right-hand anode is connected to the left-hand grid through the circuit including capacitor 79 and resistor 80 connected in multiple and through the limiting resistor 81. The grids of both sections are connected to a source of bias potential —VG via resistors 82 and 83 and are provided with diode clamps 84 and 85, which are connected to the junction between resistors 74 and 75 and are bypassed to ground potential by a capacitor 86.

The inputs are identical for both sides of the circuit and comprise a resistor and capacitor connected in series between the input terminal and the current limiting resistor, such as resistor 87 and capacitor 88 connected in series between input terminal 89 and the grid limiting resistor 81, for the left-hand side of the circuit, and resistor 91 and capacitor 92 connected in series between terminal 93 and the grid limiting resistor 78. Each input circuit also has connected thereto a pair of diodes such as the diodes 95 and 96 connected to terminals 97 and 98 on the left-hand side of the circuit, and diodes 101 and 102 connected to terminals 103 and 104 on the right-hand side of the circuit.

Output terminals 105 and 107 are connected to the anodes of their respective triode sections as shown, and are also connected via resistors 108 and 109 respectively to the input circuit of the opposite section of the trigger.

The terminals 97 and 98 of each of the triggers in the matrix are connected to the terminals $\overline{V}$ and V respectively of the synchronizing circuits described in connection with FIG. 2, while the terminals 103 and 104 of each of the triggers in the shifting register matrix are connected to the terminals $\overline{H}$ and H respectively of the synchronizing circuits shown in FIG. 2. These connections are indicated in FIG. 3 for the triggers shown therein.

The circuit shown in FIG. 4*a* is similar to that shown and described in FIG. 8 of a copending application for Letters Patent of the United States, Serial No. 469,895, filed on November 19, 1954, now Patent No. 2,988,701, by G. L. Clapper, and reference may be had to this application for a detailed explanation of the construction and operation of the trigger. It is deemed sufficient to point out in the present application that the parts are proportioned and arranged so input information supplied to one side or the other of a trigger in the matrix may be shifted to the next trigger connected to the output of the stage in question either in a horizontal or a vertical direction in accordance with the supply of horizontal or vertical synchronizing pulses to the synchronizing circuits which are connected to each trigger in the matrix.

Accordingly, by suitably relating the horizontal and vertical synchronizing pulses, it is possible to enter information into the shifting register matrix from the channel reduction circuits and thereafter to move this information through the matrix in various directions, so that the information supplied from the scanning elements can be shifted about within the register through various alignments. Thus it is possible to shift the scanning information within the shifting register matrix in such a manner that the information is reassembled in what amounts to a positional representation of the scanning information, and by providing suitable circuits which detect the existence of combinations of information at different locations within the matrix, to define the character scanned.

To accomplish this, each of the elements within the matrix, such as the triggers shown, is provided with a suitable output terminal, herein identified by the column and row coordinates, which is connected to suitable diode logic circuits which define certain combinations that can exist therein when a particular character has been scanned. The function of the shifting matrix therefore is to position the scanning information in such a manner that when the scanning information represents a particular character to be recognized it will be moved into a position wherein the outputs of the various positions within the shifting register matrix will form a combination which can be recognized by the output logic and thereby provide an output signal indicative of that character.

It will be recalled in connection with the description for FIG. 2 that the horizontal and vertical synchronizing pulses are related by factor of 8, that is, for each pulse supplied to the horizontal synchronizing terminals H and $\overline{H}$, 8 pulses are provided at the terminals V and $\overline{V}$. Accordingly, it will be seen that the information in the shifting register matrix will be shifted vertically 8 times for each time that it is shifted horizontally. It will also be noted that the horizontal shift circuits are arranged so that the information in the triggers of the shift register matrix is not shifted to the corresponding trigger in the next column during a horizontal shift, but instead is advanced vertically by one row in a diagonal manner. Accordingly, after each 8 vertical shifts a horizontal shift will occur, but since this horizontal shift also moves the information up one row in a succeeding column, it can be seen that the information in addition to being shifted horizontally once for each horizontal pulse is also shifted vertically 9 times. Since the characters to be scanned are considered to occupy a matrix which may be divided into 5 columns and which are considered to occupy a maximum height of 9 rows, it will be apparent that a character which is scanned in such a manner that the information therefrom is entered in the left most column of the shift register, as a result of operation of the channel reduction circuits, will be shifted upwardly and laterally by the shifting register so that at some time or other during the shifting operation the character will come into alignment in such a manner that the scanning information stored in the triggers of the shifting register matrix will correspond to the character scanned. At such a time, the output logic circuits connected to the various elements in the shifting register matrix will have the necessary inputs supplied thereto and accordingly will produce an output indicative of this character.

The manner in which the pattern of information stored in the shifting register matrix may be utilized for determining a character scanned is illustrated in the series of drawings FIGS. 5*a* through 5*j*. In these figures, there is shown at the left-hand side of each figure a pattern laid out in coordinates corresponding to the coordinates of the storage matrix, with the shape of a numeral in the series from 0 to 9 superimposed. The characters are laid out in the manner which may be produced by fragmentary or wire printing in which the characters are formed by a combination of small segments, such as dots, into a pattern which forms a total character. For example, in FIG. 5*a* there is shown the pattern for the numeral "2." It will be seen that a character formed in accordance with this pattern, when scanned, will supply information to the storage register matrix in such a manner that when shifted through the matrix, certain of the storage elements will contain information in the positions corresponding to the coordinate designations by rows and columns in FIG. 5*a*. That is, a positive signal output will exist at the storage elements at locations A2, B1, C1, D1, E2, E3, D4, C5, B6, A7, B7, C7, D7, and E7.

Each of the remaining numerals may be analyzed in a similar fashion, and it will be apparent that for each of the numerals shown there will exist unique combinations of information in the storage matrix when the numeral is brought into registration by the shifting action of the shifting register.

It then remains to provide suitable means for detecting such unique combinations as define the characters to be recognized. Although a number of combinations may be arrived at, the present disclosure shows the use of combinations of three out of four conditions, using the presence of information in predetermined locations, and as a check against ambiguity, the absence of information at other specified locations. These conditions are set forth in the tables to the right of each of the character representations, in which tables the first column to the left indicates the reference number of the black or white conditions which are to be employed and the succeeding four columns show which information is to be combined to designate the presence or absence of information. For example, in FIG. 5*a*, three black combinations are shown, designated 1B, 2B and 3B, and one combination of white conditions designated as W. In the first set, 1B, the conditions in the first row are A2, B1, E2 and E3. In other words, one of the combinations which must be satisfied for the recognition of a character "2" is that information be present in the form of an output from the storage element in locations A2, B1, E2 and E3 in any combination of three out of four. The second requirement is that three out of four of the conditions A7, B6, C5 and D4 must be present. The third condition is that three out of four of the conditions A7, B7, D7 and E7 must be present. The fourth set of conditions is that there must be no information at three out of four of the locations A5, A6, E5 and E6. If all four of these sets of conditions are met during the time that information is being shifted through the shifting register matrix, it is considered that the information within the matrix at that time indicates that a character "2" has been scanned.

These combinations of conditions are detected by the means of suitable logic circuits, one for each character to be recognized, and an example of which is shown in FIG. 6 of the drawings. The logic circuits shown in FIG. 6 of the drawings are those required for the detection of the combinations which indicate that a figure "2" has been scanned. Referring to FIG. 6, there are shown four groups of logic circuits which may be made up of the usual diode circuitry well known in the electronic calculator art, in which an AND function is indicated by a triangle and an OR function is indicated by a semicircle, one such combination of four AND circuits and one OR circuit being provided for each of the four sets of conditions which must be met for the recognition of the numeral "2." Thus, at the left-hand side of the drawing, there are shown four AND circuits designated by the reference characters 111 through 114, the outputs of which are combined in an OR circuit 115. The four AND circuits 111 through 114 each have three inputs, so that all of the combinations of three out of four conditions which exist for the first combination of black information are determined by the circuits. For example, the AND circuit 111 provides an output when the conditions A2, B1, and E2 is obtained. The AND circuit 112 provides an output when the shifting register contains information at locations B1, E2, and E3. The AND circuit 113 provides an output when the conditions E2 and E3 and A2 are met, and the AND circuit 114 provides an output when the conditions E3, A2 and B1 exist. Thus all possible combinations of three out of four of the conditions required in row 1B of the table shown in FIG. 5*a* are provided for with these logic circuits.

If any one of these three out of four conditions exist, then an output is provided from the OR circuit 115 to one input of an AND circuit 117, which AND circuit requires for its output the presence of an output from each of the other three combination circuits and additionally requires the presence of a delayed sample signal S, from the synchronizing circuits and a delayed inhibit signal DIH, provided by the output circuits to be subsequently described.

The AND circuits 118 through 121 respectively have their outputs connected to OR circuit 122 and detect any of the possible three out of four combinations defined by row 2B of the table of FIG. 1*a*. The AND circuits 124 through 127 respectively supply their outputs through OR circuit 128 to AND circuit 117 and detect any of the possible three out of four combinations defined by row 3B of table of FIG. 5*a*. It will be recalled that in order to avoid ambiguities the absence of information must be checked at predetermined locations within the shifting register matrix, and as shown in FIG. 5*a*, these conditions are defined by the rows designated by the letter W with or without numerical prefixes. Since the presence of no information at a predetermined location is equivalent to the negative of information present at a particular location, these conditions are checked by inverting the outputs of the storage triggers at the designated locations and thereafter supplying the inverted outputs to suitable AND and OR circuits. Thus in FIG. 6, the trigger outputs A5, A6, E5 and E6 are supplied through inverters 130 through 133 respectively to the AND circuits 134 through 137, the outputs of which are combined in an OR circuit 138 and supplied to the final AND circuit 117.

Figure 5A:
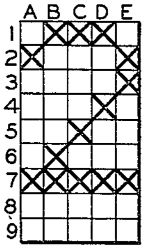
Figure 5B:
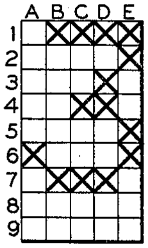
Figure 5C:
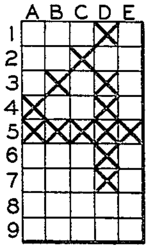
Figure 5D:
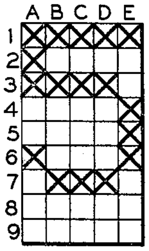
Figure 5E:
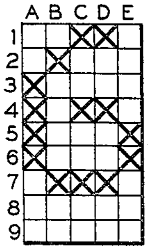
Figure 5F:
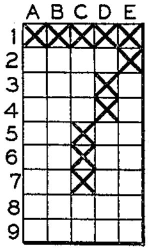
Figure 5G:
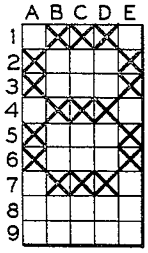
Figure 5H:
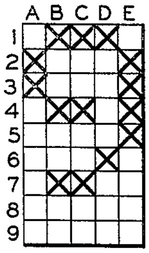
Figure 5I:
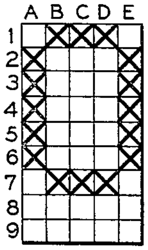
Figure 5J:
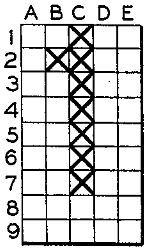

From the foregoing, it will be apparent that when the conditions set forth in the table associated with FIG. 5*a* are met by the scanning information as it is progressively advanced through the storage matrix, an output signal will be supplied from the terminal 2LO of AND circuit 117, indicating that a character "2" has been scanned.

Because erroneous outputs from the logic circuits might occur during the shifting operation, the final AND circuits in the logic, such as 117, are enabled to provide an output only when a sample pulse, S, is present. This pulse, provided for each horizontal or vertical shift pulse, is delayed by the delay unit 65 of FIG. 2, for a sufficient time interval to permit the triggers in the shifting register matrix to change state before sampling the recognition logic.

Similar logic circuits are utilized for the detection of each of the remaining characters shown in the tables, and it will be obvious to those skilled in the art, that not only can additional logic circuits be provided for detection of characters other than those shown, but that other combinations of logic circuits may be used to detect characters having different shapes as represented by different type fonts. It should be noted in connection with the numerals "7" and "1," that there is a preponderence of white information present in the matrix when the numeral is in proper registration for recognition. Because of this fact, the table of combinations for the numeral "7," shown in FIG. 5*f*, includes two rows which shown combinations of white conditions rather than a single row as shown in the remaining tables, and in the case of the numeral "1," the table of FIG. 5*j* indicates that three rows of combinations of white information are utilized in addition to two rows of black information, as contrasted with the usual use of three rows of black information and one row of white information. It should also be noted in the case of the numeral "1," that five sets of combinations are provided rather than four as done in the case of the other numerals, however, the philosophy behind the logic circuits is similar to that described in connection with FIG. 6, and the provision of tables of combinations such as shown in FIGS. 5*a* through 5*j* will enable one skilled in the art to readily design suitable logic circuits for recognizing any of the numerals defined in these drawings.

Following the detection of a character by the recognition logic circuits, it is necessary to temporarily store the character information, check for conflicting outputs or for absence of character information, and then supply a character output signal or final indication to output terminals from whence the signals may be supplied to whatever utilization device is being employed. The circuits for providing the final storage, checking, and certain of the timing functions relating to the output are shown in FIG. 7 of the drawings. Each of the final AND circuits in the diode logic, such as the AND circuit 117 shown in FIG. 6, has its output connected to the input of an electronic latch or storage device, which may be of any suitable type, such as one shown and described in Letters Patent of the United States, No. 2,628,309 issued on February 10, 1953, to Ernest S. Hughes, Jr. It is deemed unnecessary to illustrate the actual circuitry employed in such latches in the present application since they are completely illustrated and described in the foregoing reference, and moreover it should be noted that other types of storage devices, such as conventional triggers, could be employed if desired. The latches are constructed and arranged so that after an input signal is supplied thereto a signal will be supplied on the output of the latch until a resetting pulse is supplied to the latch, at which time the output signal will cease. One such latch or storage device is provided for each of the characters which the machine is designed to recognize, and as stated above, these final storage devices have their inputs connected to the outputs of the logic circuits. Only four of these storage devices or latches are shown in FIG. 7 for the sake of simplifying the drawings, but it will be understood that similar arrangements are provided for each of the outputs in the system. Thus the terminals 1LO, 2LO, 9LO and 0LO, are connected respectively to the latches 141, 142, 143 and 144.

The outputs of the latches are supplied to associated output switches or "AND" circuits 145 through 148, so that when these switches are enabled, by circuits described below, the corresponding output terminals 1F, 2F, 9F and 0F, will be energized, through output cathode follower 150 through 153, to thereby provide, to any suitable utilization device, a signal indicative of the character scanned.

The outputs of the output latches are also connected to a summing amplifier 155, which in turn governs a pair of voltage discriminators or threshold inverters 157 and 159. These parts are constructed and arranged in any one of several well known forms, and function so that an output signal is provided from discriminator 157 when and only when more than one of the output latches are energized, and so that an output signal is provided from discriminator 159 when and only when none of the latches are energized.

The output of inverter 157 is connected to the input of a latch 160, the output of which is supplied to one input of "AND" circuit 161, so that when a readout signal is supplied to the other input of "AND" circuit 161, an uncertainty signal will be supplied to terminal UC through cathode follower 162. This signal may be employed as an alarm control, a recanning control, or for any other suitable purpose, and indicates that more than one character has been recognized for one reason or another.

The output of latch 160 is also supplied through an inverter 163 to the output gates, such as 145 through 148. Thus, if an uncertainty condition exists as indicated by energization of latch 157, the output gates cannot be enabled, thereby preventing multiple output signals from being supplied simultaneously to the final output terminals.

The output of discriminator 159 is supplied to one input of an "AND" circuit 165, the output of which is connected to a terminal BL via a cathode follower 166. Thus, at readout time, a "blank" signal is supplied from terminal BL if none of the character latches are energized. This signal may be employed in any suitable manner, such as for alarm purposes and the like.

All of the character recognition signals, comprising the outputs from the storage latches and the output of discriminator 159, are supplied to an "OR" circuit 168, the output of which is supplied through a first single-shot 169 and an inverter 170 to a second single-shot 171. Accordingly, following an output from the latches or the discriminator 159, single-shot 169 will fire, followed at a suitable time interval by single-shot 171, the time interval being sufficient to allow any other character signals which may appear to set the output storage latches and hence set up the uncertainty latch 157. The output of single-shot 171 may be considered the readout pulse, and is supplied to the inputs of all "AND" circuits governing the final output circuits, so that if other conditions have been met, the proper output terminal is energized at this time.

The output of single-shot 171 is also supplied through an inverter 173 to a third single-shot 174, the output of which is connected to the resetting circuits of all of the latches, such as latches 141, 142, 143, 144 and 160, so that, following a suitable interval after the occurrence of the readout pulse, the latches are all reset, preparatory to the recognition of the next character.

In order to govern the flow of information from the recognition logic circuits to the output storage latch, a delayed inhibit signal is supplied from a terminal designated DIH to each of the final "AND" circuits of the logic circuits, as previously pointed out in connection with FIG. 6. This signal essentially indicates that the output storage and checking circuits have operated or have had time to operate following the recognition of one character, and before the next character could be recognized, because of the spacing of the characters on the document, before admitting further information from the recognition logic circuits.

To admit the first character scanned, since no character is present in the output at that time, a priming circuit is utilized for generating the initial DIH signal. The circuit includes a conventional trigger or flip-flop 180, one input of which is connected to the output of single-shot 169 and the other input of which is connected to a source of negative potential via means which detect the passage of a document past the scanning elements, in this case, a card lever contact designated CL. The output of the normally off side of the trigger is connected to one input of an "OR" circuit 182, the output of which is supplied to terminal DIH and constitutes the delayed inhibit pulse. The other input of "OR" circuit 182 is connected to the output of a fourth single-shot 183 via an inverter 184.

In operation, when a document is carried to the scanning station by the document transport system, the card lever contact CL is operated by mechanical means, not shown, supplying a negative voltage to the right-hand input of trigger 180 and turning the trigger on, and thus providing an output from trigger 180, through OR circuit 182 to terminal DIH. Accordingly, when the first sample pulse provided by the synchronizing circuits appears at terminal S following the proper positioning of the scanning information in the matrix, an output will be provided from the appropriate recognition logic circuit in the manner previously described. When single-shot 169 is energized by the output from the associated latch, an input signal is supplied to the left side of trigger 180 to turn the trigger off, thus terminating the signal at terminal DIH. Following the delay occasioned by single-shot 183, however, terminal DIH is energized by the circuit including OR circuit 182, single-shot 183 and inverter 184.

Thereafter, as long as a document is indicated at the scanning station by card lever contact CL being closed, the trigger 180 will remain off, since the subsequent pulses supplied thereto from single shot 180 will only tend to turn the trigger off, and the steady negative voltage supplied through card lever contact CL will have no effect, the trigger being of the type which responds only to negative-going transients. After the initial starting or priming operation, therefore, the energization of terminal DIH is governed solely by the delayed pulses obtained through the chain of single-shots 169 and 183 and the inverters 170 and 184.

From the foregoing it can be seen that a character sensing system in accordance with the present invention will be characterized by high speed of operation, because of the use of electronic techniques and circuitry and by relative economy, since a relatively large area can be scanned for characters with a relatively small amount of apparatus. These results are obtained not only by use of data or channel reduction techniques, but also by use of a suitable matrix arranged to shift the scanning information through the matrix so that, despite misalignment of characters, the scanning information will be rapidly shifted through positions which determine the character scanned.

A first modification of the invention is illustrated schematically in FIG. 8. In this embodiment serial optical scanning is employed, together with a form of storage matrix well suited to use with serial information input. The optical scanner is of the well-known rotating disc type, in which the character on a document 190, moving at a constant predetermined speed in a direction indicated by the arrow, is illuminated by a suitable light source such as the lamps 191 and 192. The image of the character is focused by a suitable lens assembly indicated at 193, and broken into a plurality of successive vertical scans by the cooperation of the stationary slit 194 and rotating scanner disc 195 having radial slots 196, the disc being rotated at a substantially constant speed by driving means such as a direct connected motor 198. A suitable photoresponsive device 201, such as a photomultiplier tube is arranged to receive the scanned image and provide suitable amplified scanning information through an amplifier indicated by rectangle 203. Mounted on the scanning disc shaft is a magnetic drum 205, having permanently recorded synchronizing signals on the surface thereof, which are picked up by a sync track reading head 207 and thence supplied to synchronizing circuits arranged substantially in the manner shown in FIG. 2.

In FIG. 8 there is shown a rectangular matrix of bistable storage elements similar to those previously described in connection with FIGS. 3, 4*a* and 4*b*. It can be seen that the triggers in the matrix shown in FIG. 8 are arranged in inverted positions from the manner in which they are shown in FIG. 3, for the reason that in FIG. 8 vertical shifting of information stored in the triggers takes place downward, rather than upward as employed in FIG. 3. As in FIG. 3, only three columns and four rows of the triggers are shown, but it is to be understood that as many columns and rows may be provided as necessary to provide for the necessary horizontal and vertical resolution of the scanning information. The synchronizing pulses are supplied to the triggers in the matrix by the bipolar shift pulse lines, including those connected to terminals V and $\overline{V}$ for the vertical shifting, and the lines connected to terminals H and $\overline{H}$ for supplying the bipolar horizontal shifting pulses. The output from the triggers provided by a horizontal shift operation is supplied from any one trigger in a given row to the next succeeding trigger in the column to the right, and in the same row, thus differing from the arrangement shown in FIG. 3 where the horizontal shift also caused a vertical shift of one row. Vertical shifting operations shift the operation from any given trigger in a particular column to the next succeeding trigger in the same column and in the next lower row, as may be seen by inspection of the drawing. The bottom trigger in each column has its vertical output connected back to the vertical input terminal of the trigger in the same column and in the top most row, and the outputs from the triggers are designated as shown by the coordinate designation of column and row, and are taken from the horizontal output terminal of the shifting register trigger at that point.

In order to enter information into the shifting register matrix, an "OR" circuit 209 is provided, one input of which is connected to the vertical output of the bottom most trigger in column A, the other input of which is connected to the output of the scanning amplifier 203, with the output of "OR" circuit 209 being connected to the vertical input circuit of the first shifting register trigger in column A.

In operation, the relation between length of scan, number of elements in the columns of the matrix, and the vertical sync rate, preferably, but not necessarily, is such that the synchronization pulses are supplied to the vertical synchronizing circuits at an integral multiple number of times, such as 2, for each scan through the character. That is, for example, if there are provided six rows of shifting register triggers in each column, then the number of scanning elements in each scan will be equal to 12, and this should also equal the number of vertical shifting pulses supplied to the shift register during a single scan. The horizontal shifting pulses may then be generated in a manner similar to that shown in FIG. 2, by providing a horizontal shift pulse following the completion of the required number of vertical shift pulses. In the arrangement shown in FIG. 8, the scanning information from each scan is entered at the top of the first column of the shifting register matrix, and is shifted downwardly, arriving at the lower most position at a time, for example, halfway through the scan, at which time the information is read out of the lower most trigger and returned to the top most or first trigger in the column. Following the second portion of the scanning cycle, in which the input information is again shifted downwardly through the entire shift register, and the information which may have been contained in the shift register is again returned to the feedback circuit to the topmost storage element in the matrix, a horizontal shift pulse is supplied to move all the information in the first column of the matrix to the second column, whereupon the cycle of operation is repeated. At the time the suitable number of vertical scans have been made to scan the entire scan width, as shown in FIG. 8, all of the information will have been moved into the shifting register matrix, and thus sometime or other during the total scanning operation the pattern of information in the shifting matrix will match the required combinations set up by the diode logic circuits, similar to those shown in FIG. 6, to thereby produce an output indicative of the character scanned. The various output storage and checking circuits may be arranged as shown in FIG. 7.

It is apparent that the arrangement of the shifting register matrix as shown is not limited to use with serial scanning, but may also be used with serial parallel scanning by providing the parallel scanning information in groups, which are fed in parallel to the first column of the matrix in groups which are equal to the total number of storage elements in a column, and which information is repeated for each section of the parallel scanning system. For example, if the storage matrix is arranged so that each column is six rows high, and the parallel scanning elements are twelve in number, then serial-parallel input may be provided to a matrix of the type shown in FIG. 8 by providing inputs to the storage matrix, first from the one set of six elements in the scanning array, and then from the remaining six elements in the array, at a rate equal to one-half of the horizontal shift rate. Thus it can be seen that the matrix arrangement shown in FIG. 8 may be employed for serial entry of scanning information, or for serial-parallel entry of scanning information by suitable arrangement of the inputs.

FIG. 9 of the drawings shows another modification of the invention, utilizing an unidimensional shift register, and in which the information may be entered at different predetermined points in the register. The information entered into the shift register is advanced through the register by synchronizing pulses supplied to each of the elements, and the register is arranged in such a manner that when the scanning information reaches predetermined locations signifying the scanning of a particular character, outputs will be available to logic circuits similar to those previously shown and described, for providing an output indicative of the character scanned. As shown, a plurality of shift register elements designated SR1 through SR32 are arranged in cascade, the output of each unit being supplied to the input of the next succeeding unit. Information entered into these units or storage elements is shifted one unit at a time in response to the supply of pulses simultaneously to each of the units from the terminal designated SYNC.

The shifting pulses are supplied to the shift register at a rate such that a number of pulses equal to the number of stages in each vertical column of the rectangular portion of the matrix are supplied, at the end of each scan, so that the information entered laterally in the input column during a given scan interval will be shifted out of the way of the next set of scanning information. In the example shown in FIG. 9, six shift pulses would be applied to the register following each scan interval. Thus, with a character height equivalent to 6 storage units, the six possible information bits occurring on any one scan will be moved out of the way of the next set of bits by advancing the information six stages at a time.

To prevent indexing information from entering the shift register during the shifting time, the sync generator may be utilized to govern suitable gates in the primary channels P1–P14.

It will be noted that the first fourteen of the shift register units are provided with inputs designated by the reference characters P1 through P14. These input terminals are connected to the primary scanning channels which in turn are connected through suitable amplifiers, clippers, and the like to the parallel scanning elements such as those illustrated in FIG. 2. Also, it can be seen from the drawings that the shift register units SR9 through SR32 are each provided with output terminals designated by reference characters indicating the column and row position of the shift register units in the rectangular portion of the matrix. That is, the shift register units SR9 through SR14 are provided with output terminals designated by the reference characters A1 through A6, respectively; units SR15 through SR20 are provided with output terminals designated by the reference characters B1 through B6, respectively; units SR21 through SR26 are provided with output terminals designated by the reference characters C2 through C6, respectively; and units SR27 through SR32 are provided with output terminals designated by the reference characters D1 through D6.

Thus the lower or rectangular portion of the matrix shown in FIG. 9 resembles the two-dimensional rectangular matrices previously described, and where the characters to be scanned can be recognized by patterns of information which fall within the coordinates of a six high-four wide rectangular pattern. It will be obvious that if the scanning information is supplied from the scanning elements associated with the last six shifting registers shown in the first column, in other words, if the scanning information is provided on the channels connected on the terminals P9 through P14, it can be seen that as the information is shifted through the shifting register by the sync pulses, the character will, at some time during the scanning cycle, arrive in a position which the coordinate designations will be such as to provide an output to the proper logic circuit to indicate the scanning of that character. Moreover, the additional shifting register elements shown on the left-hand side of the drawing provide for the entry of scanning information anywhere within the maximum vertical misalignment tolerance, and since the information in these shift registers is shifted down until it occupies the first column of the rectangular portion of the matrix and is thereafter shifted serially, or "snaked through" the remaining columns of the matrix, it can be seen that a character of proper dimensions, scanned anywhere within the maximum misalignment tolerance, will be shifted through the shift register in such fashion that at some portion of the scanning operation an output will be provided through the logic circuits connected to the output terminals previously referred to.

Thus, in the illustrative embodiment, a character 6 units high, scanned anywhere in a zone 14 units high, will be entered scan by scan into a group of six successive stages in the left-hand column, and the information will be stepped through the register six stages at a time. At some time during the shifting, a valid combination will be presented to the logic circuits to produce an output indicative of the scanned character.

The synchronizing pulses for the operation of the matrix shown in FIG. 9 would be obtained by suitable circuits, not shown, but generated in synchronism with the scanning operation as previously described with the other embodiments of the invention.

Referring now to FIG. 10 of the drawings, there is shown a further modification of the invention in which a movable recording medium, such as a magnetic recording drum, may be utilized as a storage matrix. In FIG. 10, there is shown an optical scanning system of the type previously described in connection with FIG. 8, and a detailed description of this portion of the apparatus is considered unnecessary. A magnetic drum 207 is mounted on the same shaft as the scanning disc 195, and is arranged to have a plurality of recording tracks or channels thereon, each of which is provided with a write head 209 as shown, a plurality of read heads such as the heads 211 shown, and an erase head such as the heads 215. The write heads 209 are all connected through the amplifier 203 which provides scanning information derived by the photomultiplier 201. It can be seen therefore that the scanning information provided during the scanning of the character is recorded simultaneously by the action of the read heads 209 on each track of the drum. The read heads 211 are disposed and arranged along the track in such manner that they provide output signals indicative of the positions of the recorded information, in much the same manner that the storage triggers of the storage matrices described provide positional information derived from character scanning. The outputs of these read heads are supplied through suitable amplifiers and thence to logic circuit means such as previously described, which act to provide an output signal indicative of a particular character when the information recorded on the drum indicates the scanning of that character. Following the writing and reading operation, the recorded material is erased by permanently energized erase heads, or by permanent magnetic erasing means, in preparation for recording of further scanning information for the next character to be recognized.

The manner of alignment of the various parts shown in FIG. 10 is seen more clearly in FIG. 11 which shows a developed or "unwrapped" view of the recording surface of the drum and the relative relation of the various heads associated with the different recording tracks or channels on the drum. As shown, there is provided one read head for each bit of character information provided during a scan, and for reasons of close spacing, the heads are skewed across the multiple tracks, all of which carry identical scanning information, as indicated by the shading, so that effectively, the read heads associated with any one scan preserve the same time relationship as if the scanning information were provided on one single track and all heads were reading from the same track. Thus, for example, the information recorded during the first scan through a character, when passed under the uppermost set of read heads, can produce outputs at one or more terminals designated A1 through A6, connected to the read heads through suitable read amplifiers 217, indicated diagrammatically, when the scanning information indicates that portions of the character have been sensed at predetermined positions, six in number, along the length of the first scan. At the same time, the information obtained during a second or B scan will be passing under the heads which provide outputs at terminals B1 through B6, so that if information is presented at predetermined points during the scanning of this character, such information will then be passing under the appropriate heads associated with terminals B1 through B6 and will provide outputs therefrom. It will be understood, therefore, that in each group of reading heads, there will be as many signals derived as the number of elements required in the scanning of the character in one dimension of the scan, and there will be as many groups of heads as there are elements in the other dimension of scanning. Thus, with only two groups of six heads as shown, a character representation two elements wide and six elements long is indicated, but it will be apparent that any number of elements may be utilized, by providing a suitable number of read heads in each group, and a suitable number of groups.

Although the drawings illustrate the use of skewed read heads and aligned write heads, it is apparent that the read heads could be aligned and the write heads skewed, or various combinations of head spacings could be employed, as long as the necessary time relationships between the read and write heads of a track are maintained.

As previously pointed out, the reason for the use of the multiple tracks and the skewed heads is for purposes of providing suitable mechanical separation of the heads, due to size limitations, however, by using specially constructed magnetic reading heads with very close spacing, or using high rotational speeds for the drum, in which case the character information would be spread out to a greater extent along with the periphery of the drum, a single track drum could be employed, with all reading heads arranged in groups along the one track. Although FIGS. 10 and 11 indicate the use of a magnetic drum as the recording means, it will be obvious that other types of recording means could be employed, for example, magnetic tapes or magnetic discs.

In the light of all of the foregoing description, it can be seen that the present invention provides a high speed character recognition system, characterized by the relative economy in parts, which is capable of accepting scanning information involving relatively large misalignment tolerances, and providing output signals indicative of the characters scanned anywhere within this misalignment tolerance.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a character recognition system, in combination, scanning means for scanning characters to be recognized, a two-dimensional storage matrix, means synchronized with said scanning means for advancing the scanning information into said matrix along one of said dimensions, means synchronized with said scanning means for advancing the scanning information through said matrix along the other of said dimensions, and logic circuit means connected to said matrix and rendered effective when the location of data in said matrix signifies the scanning of a particular character for providing an output indicative of that character.

2. In a character recognition system, in combination, scanning means for scanning characters to be recognized, in a plurality of serial scans, a two-dimensional storage matrix, means synchronized with said scanning means for supplying said scanning information serially to said matrix along one of said dimensions, means synchronized with said scanning means for advancing the scanning information through said matrix along the other of sad dimensions, and logic circuit means connected to said matrix and rendered effective when the location of scanning information data in said matrix signifies the scanning of a particular character for providing an output indicative of that character.

3. In a character recognition system, in combination, parallel scanning means for scanning a character to be recognized in a plurality of adjacent and concurrent scans, a two-dimensional storage matrix, means synchronized with said scanning means for supplying information from said scanning means to said matrix in parallel along one dimension of said matrix, means synchronized with said scanning means for successively advancing information stored in said matrix along the other dimension of said matrix, and logic circuit means operatively connected to said matrix and rendered effective when the location of scanning information in said matrix signifies the scanning of a particular character for providing an output indicative of that character.

4. In a character recognition system, in combination, a plurality of scanning elements arranged to scan a character to be recognized in a corresponding plurality of adjacent and concurrent scans, transport means for moving a character-bearing document relative to said scanning elements, a two-dimensional shifting matrix of storage elements arranged in rows and columns, means for supplying said scanning information from said scanning elements to corresponding storage elements in the first column of said shifting register matrix, first synchronizing means governed by said transport means for shifting information stored in each column of said shift register laterally to the following column, second synchronizing means governed by said transport means for shifting information stored in each row of said shifting register matrix to the next succeeding row, and logic circuit means connected to selected elements in said shifting register matrix and effective when said selected elements contain information signifying the scanning of a particular character for providing an output signal indicative of that character.

5. In a character recognition system, the combination comprising, a plurality of scanning elements arranged in a line transverse to the motion of a character to be scanned, each of said elements providing an output signal when a portion of a character is moved past said scanning element to thereby provide a plurality of concurrent and adjacent scans, a document transport system for moving a character-bearing document relative to said sensing elements, a two-dimensional shifting register matrix comprising a plurality of bistable elements arranged in rows and columns, circuit means operatively connected to said scanning elements and the bistable elements in said first column of said shifting register matrix for entering scanning information in said first column, first synchronizing means operatively connected to said bistable elements and governed by said transport system for simultaneously shifting the information in said shifting register to succeeding columns, second synchronizing means operatively connected to said bistable elements and governed by said transport system for simultaneously shifting the information in the rows of said matrix to a succeeding row, and logic circuit means connected to predetermined ones of said bistable elements to provide output signals indicative of the character scanned.

6. In a character recognition system, in combination, a plurality of scanning elements arranged to scan a character in a plurality of concurrent and adjacent scans, document transport means for moving said document past said scanning elements, a two-dimensional shifting register matrix including a plurality of bistable elements arranged in a plurality of columns and rows, circuit means for supplying scanning information from said scanning elements to the first column of said matrix, synchronizing circuit means governed by said document transport means for generating first and second sets of synchronizing signals, said second set of synchronizing signals having a frequency as many times greater than the frequency of said first set of synchronizing signals as the number of rows in said matrix, circuit means connecting said synchronizing means with the elements of said matrix, and logic circuit means, one for each character to be recognized, connected to predetermined elements in said matrix, and effective when the scanning information in said matrix denotes the scanning of a particular character to provide an output signal indicative of that character.

7. In a character recognition system, in combination, a two-dimensional shifting register matrix comprising a plurality of bistable storage elements arranged in columns and rows, horizontal and vertical drive means connected to said matrix for supplying horizontal and vertical shift pulses to said matrix, each of said horizontal shift pulses effective when supplied to said storage elements to shift the information therein to the next succeeding column and to the next succeeding row, each of said vertical shift pulses effective to shift information in each row to the next succeeding row, said vertical shift pulses being supplied to said matrix at a rate greater than said horizontal shift pulses, a document transport system, means synchronized with said document transport system for governing said horizontal and vertical drive means, and logic circuit means connected to the elements in said matrix and effective when the information in predetermined locations in said matrix corresponds to that obtained by scanning a particular character to provide an output signal indicative of that character.

8. In a character sensing system, in combination, a plurality of parallel scanning elements arranged to scan a character to be recognized in a plurality of adjacent and concurrent scans, the number of said scanning elements corresponding to a first predetermined number required to span a character of maximum dimensions transverse to the direction of scanning, plus the number required to scan the difference between a character of said maximum dimension and the maximum misalignment tolerance, a plurality of primary information channels, one for each of said scanning elements, connected to said scanning elements to receive scanning information therefrom, a plurality of secondary channels equal in number to at least said first predetermined number, channel reduction circuit means for connecting said secondary channels to said primary channels in repeated ordered sequence, whereby the secondary channels are connected to primary channels spaced apart by a number of primary channels equal to said first predetermined number, a shifting register matrix comprising a plurality of bistable storage elements arranged in columns and rows, said secondary channels being connected to said storage elements in the first column of said matrix, synchronizing circuit means effective when operative to supply horizontal and vertical shifting pulses to said matrix, the number of vertical pulses per horizontal pulse being equal to said predetermined number less one, each of said storage elements being arranged so that information stored therein is advanced one row for each columnar advance, and so that information shifted vertically from a terminal row is supplied as an input to the other terminal row, and logic circuit means, one for each character to be recognized, connected to predetermined ones of said storage elements for detecting a predetermined arrangement of scanning information in said matrix signifying the scanning of a particular character and providing an output signal indicative of that character.

9. In a character recognition system, in combination, a serial scanning means for progressively scanning a character to be recognized in a plurality of successive scans, a two-dimensional storage matrix comprising a plurality of columns and rows of bistable storage elements, the number of columns being equal to the maximum number of scans required to scan a character, and the number of rows being a predetermined number equal to at least the minimum number of vertical components of scanning sufficient to provide resolution of the character, means for supplying scanning information from said scanning means to the storage element in the first row and first column of said matrix, means for progressively advancing said scanning information row by row and column by column through said matrix, and logic circuit means, one for each character to be recognized, connected to predetermined ones of said storage elements in combinations signifying the scanning of a particular character and providing an output signal indicative of that character.

10. In a character recognition system, in combination, a serial scanning means for progressively scanning a character to be recognized in a plurality of successive scans, a two-dimensional storage matrix comprising a plurality of columns and rows of bistable storage elements, the number of columns being equal to the maximum number of scans required to scan a character and the number of rows being a predetermined number equal to at least the minimum number of vertical components of scanning sufficient to provide resolution of the character, means for supplying scanning information from said scanning means to the storage element in the first row and first column of said matrix, means for progressively advancing said scanning information column by column through said matrix, means for progressively advancing said scanning information row by row through said matrix at a rate equal to some multiple of the scanning rate, means for re-entering scanning information in the initial row of said matrix from the last row in said matrix, and logic circuit means, one for each character to be recognized, connected to predetermined ones of said storage elements in combinations signifying the scanning of a particular character and providing an output signal indicative of that character.

11. In a character recognition system, in combination, scanning means for scanning characters to be recognized, storage means in which information can be stored in spaced locations defined by a first and a second dimension, means synchronized with said scanning means for advancing scanning information relative to one dimension of the character scanned into said storage means along the first said dimension, means for advancing the stored information in said storage means along the second of said dimensions, and means connected to said storage means effective when the location of information in said storage means signifies the scanning of a particular character for providing an output indicative of that character.

References Cited in the file of this patent

UNITED STATES PATENTS 2,897,481 Shepard ---------------- July 28, 1959